Dec. 13, 1960  B. N. ENANDER  2,964,669
TRAVELING WAVE TUBE
Filed Aug. 25, 1955

INVENTOR.
BENGT N. ENANDER
BY
ATTORNEY

United States Patent Office 2,964,669
Patented Dec. 13, 1960

2,964,669

TRAVELING WAVE TUBE

Bengt N. Enander, Princeton, N.J., assignor to Radio Corporation of America, a corporation of Delaware Filed Aug. 25, 1955, Ser. No. 530,602

8 Claims. (Cl. 315—3.5)

This invention relates to traveling wave tubes. Particularly, it concerns improvements in traveling wave tubes having delay lines provided with non-reciprocal attenuators utilizing gyromagnetic phenonema.

In a traveling wave tube an electromagnetic signal wave is fed to one end of a suitable slow wave propagating circuit or delay line, such as an elongated metal helix of such diameter and pitch that the axial velocity of the wave along the helix is reduced to a fraction, say $\frac{1}{10}$, of the velocity of light. An electron beam of substantially uniform velocity distribution is projected along the helix at a velocity approximately equal to the axial wave velocity. Under such conditions, the electron beam and the wave traveling on the helix interact to cause the amplitude of the wave to increase exponentially; hence, an amplified signal is obtained at the output end of the tube. For maximum amplification the beam velocity would be slightly greater than the undisturbed wave velocity of the helix, that is, the wave velocity without the beam.

Feedback due to amplification of signal waves reflected at the input and output of the tube often causes oscillation. Also, the tube may act as a backward wave oscillator due to space harmonic components of reflected signal waves on the wave guiding means, that is, when the negative space harmonic component traveling in the direction of electron flow interacts with the electrons. In previous traveling wave tubes, oscillations have been avoided by the introduction of loss along the slow wave propagating circuit between the input and output of the tube. The loss is introduced either in the form of a relatively low loss material distributed uniformly along the circuit or of a relatively high loss material concentrated over a relatively small portion of the circuit. The use of a uniformly distributed loss material reduces both the efficiency and the gain of the tube, while the use of a concentrated loss material not only reduces the tube efficiency but also introduces a non-uniformity in tube gain at different traveling wave frequencies. Non-reciprocal attenuators are known which make use of a type of gyromagnetic phenomena known as ferromagnetic resonance phenomena. These ferromagnetic attenuators, when used in traveling wave tubes, selectively attenuate waves traveling in one direction within the tube without attenuating waves traveling in an opposite direction. In such attenuators a ferromagnetic material, such as a ferrite member, is disposed adjacent to a portion of the path of travel of the waves. The resultant non-reciprocal interaction between the fields of the waves and that of the electrons in the ferromagnetic material is used to effect the selective attenuation. Previous non-reciprocal attenuators, however, have not proven entirely satisfactory. For example, an attenuator comprising a sleeve of a ferrite material disposed around a traveling wave tube helix (and wherein the ferrite materal itself is used to absorb the undersired wave energy) requires relatively high magnetic fields to energize the ferrite material at relatively high frequencies. For example, at frequencies of the order of 10,000 megacycles or higher, the magnetic field required by the ferrite material is so high that it is difficult to obtain in practical structures.

Accordingly, it is one of the objects of the invention to provide an improved traveling wave tube which is free of oscillation and which at the same time exhibits a relatively high gain at relatively high frequencies.

It is another object of the invention to provide an improved traveling wave tube adapted to operate at relatively high frequencies and having improved attenuating means along the wave propagating circuit thereof, the attenuating means being selective to attenuate a wave traveling in one direction without substantially attenuating a wave traveling the same path in an opposite direction.

The foregoing and related objects are achieved in accordance with the invention by the utilization of that portion of gyromagnetic phenomena dealing with changes in apparent permeability of a ferrite member under different circumstances as distinguished from ferromagnetic resonance phenomena, as will be explained below. The invention provides a traveling wave tube having a slow wave propagating structure such as a helix and a hollow cylindrical ferrite member surrounding the helix and having lossy material concentric with and adjacent thereto. The lossy material is one, such as graphite, which has the property of absorbing energy from a wave passing through it. The ferrite member is disposed adjacent to the helix and extends in a circumferential direction with respect to the helix and is magnetized in said direction. As will be explained below in greater detail the interaction between the magnetic field of a wave on the helix and the spinning electrons in the ferrite member is different for forward and backward traveling waves. Since the amount of wave energy absorbed by the lossy material is determined by the aforementioned interaction, waves traveling in different directions will be attenuated by different amounts.

The invention is described in greater detail in connection with the accompanying single sheet of drawings wherein.

Figure 1:
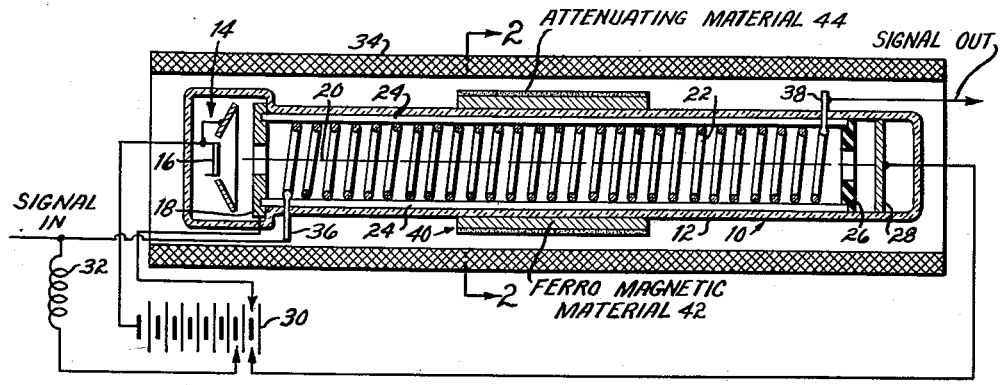
Fig. 1 is a longitudinal sectional view, taken through line 1—1 of Fig. 2, of a traveling wave tube according to one form of the invention.

Referring now to the drawing in greater detail, there is shown in Fig. 1 one form of traveling wave amplifier tube 10 in which the invention may be used. Within an elongated envelope 12 and at one end thereof is an electron gun 14 which may include a cathode 16 having a heater (not shown) and an accelerating electrode 18 disposed adjacent to the cathode 16 in a known manner to produce a beam of electrons 20. The particular tube shown by way of example includes a delay line structure in the form of helix 22 which extends axially within the envelope 12. The helix 22 is supported within the envelope 12 by non-conductive rods 24 spaced around the outside surface of the helix. The rods 24 may be supported at one end thereof by a ring-shaped non-conductive support member 26 and at the other end thereof by an electrode 18 of the electron gun 14. The support rods 24 and member 26 are preferably of a non-magnetic ceramic material. An electron collecting element or collector 28 is positioned within the envelope 12 at the end thereof remote from the electron gun 14. The collector 28 and the electron gun 14 define between them the path of travel of the electron beam 20.

A direct current power supply, shown schematically as a battery 30, is connected to the electron gun elements 14, the helix 22, and the collector element 28, in order to maintain them at the desired D.C. potentials with respect to each other. The voltages at the accelerating and collecting electrodes may be adjustable. The helix 22 may be connected to the power supply through a choke 32, the choke being used to isolate the radio frequency potentials on the helix from the power supply.

A solenoid 34 produces a beam focusing magnetic field having flux lines extending along the path of the electron beam 20. As the tube envelope 12 is of a magnetically transparent material, the magnetic field is substantially unimpeded by the envelope.

The wave propagating circuit, comprising the helix 22, is provided at the end adjacent to the electron gun 14 with a signal input 36 through which the signal wave may be passed into the tube, and at the end of the tube remote from the input is provided with an output 38 providing an exit for the amplified wave. It will be understood that while the input and output are illustrated in the drawing as directly connected to the helix 22, electromagnetic wave energy may instead be transferred to and from the helix by any suitable input and output coupling means. For example, the input and output may each be inductively coupled through the envelope to the helix.

Figure 2:
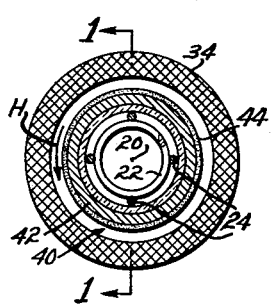
Fig. 2 is a transverse sectional view taken through line 2—2 of Fig. 1.

In accordance with the invention, there is provided a non-reciprocal attenuator 40 comprising ring-shaped member 42 of a ferrite material in the form of a hollow cylinder of circular cross section, the member 42 surrounding the helix 22 in a region intermediate the electron gun 14 and the collector 28. While the ferrite member 42 is illustrated as being a single continuous cylinder, in order to assure focusing of the beam 20 the member may instead be comprised of a plurality of axially spaced ferrite rings in a manner described below in connection with Figs. 7 and 8. The ferrite member 42 has disposed closely adjacent thereto and concentrically around the outside surface thereof an attenuating layer 44 in the form of a coating of an attenuating or lossy material, such as graphite. The ferrite member 42 is circumferentially magnetized in a direction indicated by letter H in Figure 2 and is of a ceramic permanent magnet material with high magnetic anisotropy. This kind of material will in the following be called a hard ferrite and may, for example, be of the chemical formula $XO.nFe_2O_3$, where X represents a bivalent metal such as barium or cobalt and $n$ is any integer. Where soft ferrite is referred to below there is meant a ceramic material having a relatively low coercive force such as one having a spinel structure and which consists of a metallic oxide having the general chemical formula $YFe_2O_4$, where Y represents a bivalent metal such as magnesium, manganese, or nickel. A hard ferrite is thus a permanent magnet material and a soft ferrite is a soft magnetic material. While the ferrite member 42 illustrated in Figs. 1 and 2 is of a hard ferrite, the ferrite member may instead be of other materials and circumferentially magnetized in different ways, such as those illustrated in Figs. 5 through 8, and explained in greater detail below.

According to presently accepted theory, magnetized ferromagnetic materials such as the aforementioned ferrites have the property of exhibiting different permeabilities to electromagnetic waves depending on the direction of rotation of the magnetic component of the wave, the direction of rotation of the magnetic component in turn depends upon the direction of propagation of the wave. Thus, the permeability of the ferrite member 42, magnetized in a given direction H, "seen" by an electromagnetic signal wave traveling a path adjacent to the member depends upon the direction of propagation of the wave. The amount of penetration of the wave through the ferrite member 42 depends upon the permeability of the ferrite member as "seen" by the wave. If a layer 44 of lossy material is positioned around the ferrite member 42, and a wave has a path of travel along the helix 22, the amount of the wave which reaches the lossy material is dependent upon the amount of wave penetration through the ferrite member 42. Thus a forwardly traveling wave (one traveling from the tube input 36 toward the output 38) would not be appreciably attenuated since it would not appreciably penetrate the ferrite member 42 and would not reach the attenuating material layer 44. However, a backwardly traveling wave would have portions thereof which would penetrate through the ferrite member 42 to the layer 44; the backwardly traveling wave would thus be substantially attenuated. The lossy material thus reacts in a non-reciprocal manner with waves traveling along the helix 22. The lossy material is thus adapted to interact by different amounts with waves traveling in opposite directions along the helix and to consequently attenuate by different amounts of waves traveling in opposite directions.

Figure 3:
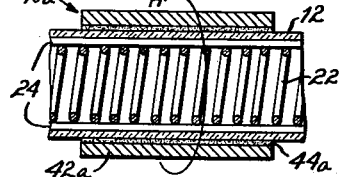
Figs. 3 and 4 are fragmentary longitudinal sectional views of traveling wave tubes embodying other forms of the invention.

Referring now to Fig. 3, there is illustrated another embodiment of the invention. If the helix 22 is provided with an attenuator 40a in which a layer 44a of lossy material is positioned concentrically on the inside of a hollow cylindrical ferrite member 42a, and the ferrite member is magnetized in a direction opposite that of the ferrite member 42 of Figs. 1 and 2, there will be maximum attenuation of a wave traveling along the helix 22 when the wave does not penetrate the ferrite member (when the wave is confined within the ferrite member and thus within the attenuating influence of the attenuating material layer 44a). Conversely, when the wave on the helix 22 penetrates the ferrite member 42a, only a relatively small portion of the wave is within the attenuating influence of the layer 44a and the wave as a whole is not appreciably attenuated.

Figure 4:
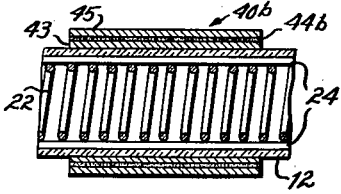

Fig. 4 illustrates another form of the invention. In this figure a non-reciprocal attenuator 40b comprises a layer 44b of attenuating material sandwiched concentrically between a pair of hollow cylindrical ferrite members 43 and 45. The directions of magnetization of the members 43 and 45 are in opposite directions in a manner such that a forwardly traveling wave is prevented from penetrating through the inner ferrite member 43 and is thus substantially unattenuated, while a backwardly traveling wave penetrates the inner member 43, reaches the attenuating layer 44b, and is retained within the region of the attenuating material by the outer ferrite member 45, the outer member being substantially impenetrable by the backwardly traveling wave.

Figure 5:
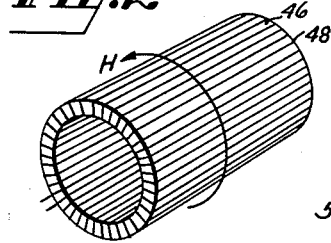
Figs. 5 and 6 are perspective views of ferromagnetic members useful in practicing the invention.

Fig. 5 depicts another form of ring-shaped ferromagnetic member useful in practicing the invention. A hollow cylindrical ferromagnetic member 46, which may for example be a soft ferrite, is magnetizable in a circumferential direction by passing a current through a toroid coil 48 wound around the member 46. The electromagnetically energized member 46 may be substituted for the ferromagnetic member 42 or 42a in Fig. 1 or Fig. 3, in which case it will cooperate with the concentric layer 44 or 44a to react with a signal wave in a manner similar to that described with respect to Figs. 1 and 3.

Figure 6:
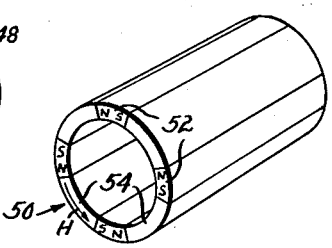

Fig. 6 illustrates another ferromagnetic member useful in practicing the invention. A ring-shaped ferromagnetic member 50 comprises a plurality of circumferentially magnetized, circumferentially spaced, alternately hard and soft ferrite elements 52 and 54, respectively. The soft elements 54 are thus magnetizable by the hard, or permanently magnetized, elements 52 which serve to maintain the soft ferrite elements 54 magnetized in a circumferential direction.

Figure 7:
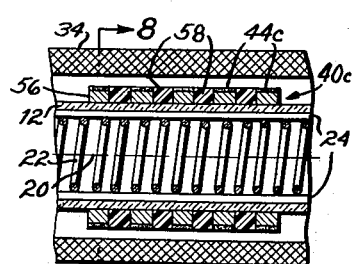
Fig. 7 is a fragmentary longitudinal sectional view of a traveling wave tube embodying yet another form of the invention.
Figure 8:
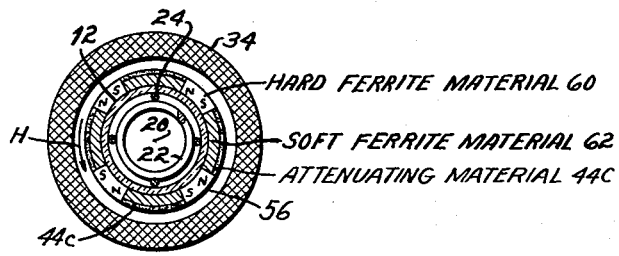
Fig. 8 is a transverse sectional view taken on line 8—8 of Fig. 7.

In the embodiment shown in Figs. 7 and 8, in order to assure that the magnetic field from the solenoid 34 penetrates the ferrite member and reaches the portion of the electron beam 20 therein, an attenuator 40c may be a hollow cylindrical member made up of a plurality of axially-spaced ferromagnetic rings 56 each separated from the other by a ring 58 which is of a non-magnetic material such as a non-magnetic ceramic. Thus the magnetic field in the region of the path of the electron beam within the attenuator 40c is neither distorted or decreased to an extent sufficient to defocus the beam to an appreciable extent.

As shown in Fig. 8, each of the ferromagnetic rings 56 may in turn be comprised of a plurality of circumferentially-spaced, alternately hard and soft ferrite elements 60 and 62, respectively, in the manner described with respect to Fig. 6, with an attenuating layer 44c on the outer surface of each soft ferromagnetic element 62.

The invention thus provides an improved traveling wave tube having attenuating means which is selective to attenuate a wave traveling in one direction along the delay line of the tube without substantially attenuating a wave traveling an opposite direction therealong.

What is claimed is:

1. A traveling wave tube comprising an elongated helix, an electron gun for projecting a beam of electrons along said helix for interaction therewith, a hollow cylindrical ferrite member disposed adjacent to said helix and surrounding a portion of the length thereof, and a layer of lossy material concentric with and closely adjacent to said member, said ferrite member being adapted to interact by different amounts with waves traveling in opposite directions along said helix and said lossy material being adapted to interact substantially with waves traveling in only one direction along said helix.

2. A traveling wave tube as claimed in claim 1, wherein said ferrite member comprises a pair of oppositely circumferentially magnetized hollow ferrite cylinders concentrically surrounding said helix, and said layer of lossy material is sandwiched between said hollow cylinders.

3. A traveling wave tube comprising an elongated helix; an electron gun for projecting a beam of electrons along said helix for interaction therewith; a circumferentially magnetized, hollow, substantially cylindrical ferrite member surrounding said helix and made up of alternately hard and soft ferrite elements circumferentially disposed around said helix and adapted to interact by different amounts with waves traveling in different directions along the turns of said helix; and a layer of lossy material disposed on one surface of said member and in interactable relation with waves propagated along said helix, whereby said lossy material is adapted to attenuate by different amounts waves traveling in different directions along said helix.

4. A traveling wave tube comprising a helix; and electron gun for projecting a beam of electrons along said helix for interaction therewith; and a non-reciprocal attenuator for selectively attenuating substantially only waves traveling along said helix in one direction; said attenuator comprising a hollow cylindrical member made up of a plurality of circumferentially magnetized, axially-spaced, ferrite rings surrounding said helix and adapted to interact by different amounts with waves traveling in opposite directions along the turns of said helix, and a layer of lossy material disposed on each of said rings and in interactable relation with waves propagated along said helix, whereby said lossy material is adapted to attenuate by different amounts waves traveling in opposite directions along said helix.

5. A traveling wave tube comprising a helix; an electron gun for projecting a beam of electrons along said helix for interaction therewith; and a non-reciprocal attenuator for selectively attenuating substantially only waves traveling along said helix in one direction; said attenuator including a hollow cylindrical member made up of a plurality of circumferentially magnetized, axially spaced ferrite rings each comprising alternately hard and soft ferrite elements circumferentially surrounding said helix and adapted to interact by different amounts with waves traveling in opposite directions along the turns of said helix, and a layer of lossy material disposed on each of said soft ferrite elements and adapted to interact substantially with waves traveling in only one direction along said helix.

6. A traveling wave tube as claimed in claim 1, wherein said ferrite member comprises a circumferentially-magnetized hollow cylindrical member and said layer of lossy material is disposed on and substantially coextensive with one surface of said member.

7. A traveling wave tube as claimed in claim 6, wherein said layer is on the outside of said member.

8. A traveling wave tube as claimed in claim 6, wherein said layer is on the inside of said member.

References Cited in the file of this patent

UNITED STATES PATENTS

| | | |
|---|---|---|
| 2,452,530 | Snoek | Oct. 26, 1948 |
| 2,636,948 | Pierce | Apr. 28, 1953 |
| 2,644,930 | Luhrs et al. | July 7, 1953 |
| 2,645,758 | Van de Lindt | July 14, 1953 |
| 2,777,906 | Shockley | Jan. 15, 1957 |
| 2,812,470 | Cook et al. | Nov. 5, 1957 |
| 2,815,466 | Sensiper | Dec. 3, 1957 |
| 2,849,642 | Goodall | Aug. 26, 1958 |
| 2,850,701 | Fox | Sept. 2, 1958 |
| 2,860,278 | Cook et al. | Nov. 11, 1958 |
| 2,863,086 | Cook | Dec. 2, 1958 |
| 2,867,745 | Pierce | Jan. 6, 1959 |
| 2,870,367 | Everhart et al. | Jan. 20, 1959 |

OTHER REFERENCES

The Bell System Technical Journal, vol. 34, No. 1, January, 1955, published by A.T. & T. Co., New York City, pages 64 to 71.